United States Patent [19]

Halloway et al.

[11] 3,779,801

[45] Dec. 18, 1973

[54] HIGH MOBILITY EPITAXIAL LAYERS OF PBTE AND $PB_{1-x}SN_x$ TE PREPARED BY POST- GROWTH ANNEALING

[75] Inventors: Henry Halloway, West Bloomfield; Eleftherios Miltiadis Logothetis, Dearborn Heights, both of Mich.

[73] Assignee: Ford Motor Company, Dearborn, Mich.

[22] Filed: Mar. 26, 1971

[21] Appl. No.: 128,569

[52] U.S. Cl. ............. 117/201, 117/106 R, 117/107, 148/175

[51] Int. Cl. ......................... B44c 1/18, C23c 11/00

[58] Field of Search ................ 117/201, 106 R, 107; 148/175, DIG. 2, DIG. 4, DIG. 5

[56] References Cited

OTHER PUBLICATIONS

Farinre et al., Preparation and Properties of $Pb_{1-x}Sn_x$ Te Epitaxial Films, J. Vacuum Sci. Techo. (1970) (7) (1) (Jan./Feb.) pg. 121–126.

Holloway et al., Communications, Vol. 41, No. 8. July, 1970 pg. 3543–3545, Epitaxial Growth of Lead Tin Telluride.

*Primary Examiner*—Ralph S. Kendall
*Assistant Examiner*—M. F. Esposito
*Attorney*—Thomas H. Oster and John R. Faulkener

[57] ABSTRACT

This invention teaches the preparation of lead tin telluride films when such films are deposited upon a cleaved base of barium fluoride. Barium fluoride supported epitaxial films of lead tin telluride are especially useful as a detector of radiation in the infra red region centered upon the 10 micron (100,000 Angstrom) wave length. Post-growth annealing has been found to give n-type layers of PbTe and $Pb_{1-x}$ $Sn_x$ Te (with $x \approx 0.2$) with much larger low-temperature Hall mobilities than as-grown layers.

8 Claims, No Drawings

HIGH MOBILITY EPITAXIAL LAYERS OF PBTE AND $PB_{1-X}$ $SN_X$ TE PREPARED BY POST-GROWTH ANNEALING

BACKGROUND OF THE INVENTION

Alloy films of lead tin telluride have been investigated intensively recently with particular attention to their photo-voltaic properties. Especial attention has been paid to their possible use a detectors of infra red radiation in the vicinity of ten microns. This particular radiation band corresponds to the output of carbon dioxide lasers and to a "window" in the atmosphere. At this particular band, radiation is not attenuated significantly by water vapor which is always present in the atmosphere.

The exploration of these lead tin tellurides is quite recent and for the benefit of those who may not be familiar with the genesis of this art, the following brief bibliography is made of record.

Alloy Film of $PbTe_xSe_{1-x}$

Bis and Zemel Journal of Applied Physics Vol. 37, No. 1, Jan., 1966. Pages 228 to 230

Reproducible Preparation of $Sn_{1-x}Pb_xTe$

Film with Moderate Carrier Concentrations Bylander Materials Science and Engineering 1, 1966. Pages 190 to 194

Photovoltaic Effect in $Pb_xSn_{1-x}Te$ Diodes

Melngailis and Calawa Applied Physics Letters Vol. 9, No. 8 October 15, 1966. Pages 304 to 306

Photoconductivity in Single-Crystal $Pb_{1-x}Sn_xTe$

Melngailis and Harman Applied Physics Letters Volume 13, No. 5, September 1968. Pages 180 to 183

Journal of Vacuum Science Technology 6,917 1969. Pages 917, 918

These epitaxial lead tin telluride films are usually prepared by evaporation in a vacuum as clearly taught by the Bis and Zemel publication. This evaporation technique is well known. These epitaxial films are usually deposited upon a substrate of suitable crystallography. Barium Fluoride has been found to be decidedly superior to the alkali halides formerly employed as substrates.

THE INVENTION

Layers of PbTe and $Pb_{1-x}Sn_xTe$ with $x$ approximately 0.2 were vacuum deposited at 2 micrometers per hour on a substrate of cleaved barium fluoride at 324°C. The layer thickness were 1 to 7 micro meters. For the benefit of those not familiar with this technique a complete description is contained in J. Appl Phys. 41, 3743 (1970 by Holloway, Logothetis and Wilkes).

The unusual qualities of these deposits were obtained by annealing them at 300° to 350°C in evacuated pyrex ampules of small volume. A typical volume of such an ampule would be 5 to 10 cubic centimeters. The annealing was carried on for a time period of 20 to 100 hours.

A comparison of electrical properties at 77°K, before and after annealing is given in the appended table.

Electrical Properties at 77°K, Before and After Annealing

| Specimen No. | Layer Composition | Carrier Concn ($cm^{-3}$) and Type Unannealed | Annealed | Hall Mobility ($cm\ V^{-1}s^{-1}$) Unannealed | Annealed |
|---|---|---|---|---|---|
| 1 | PbTe | $5.0\times10^{16}$N | $6.4\times10^{16}$N | 20700 | 26600 |
| 2 | PbTe | $4.4\times10^{16}$P | $2.2\times10^{17}$N | 10800 | 24800 |
| 3 | PbTe | $3.1\times10^{16}$P | $1.7\times10^{18}$N | 17500 | 28000 |
| 4 | PbTe | $4.0\times10^{16}$P | $4.0\times10^{18}$N | 8700 | 20400 |
| 5 | PbTe | $1.7\times10^{16}$P | $4.5\times10^{16}$N | 5300 | 24100 |
| 6 | $Pb_{0.82}Sn_{0.18}Te$ | $1.0\times10^{18}$P | $1.5\times10^{17}$N | 10100 | 35000 |
| 7 | $Pb_{0.80}Sn_{0.20}Te$ | $8.0\times10^{17}$P | $5.7\times10^{16}$N | 11800 | 32500 |
| 8 | $Pb_{0.76}Sn_{0.24}Te$ | $2.3\times10^{18}$P | $8.3\times10^{15}$N | 6600 | 28000 |

After annealing most of the specimens were of the n-type. This is consistent with a small loss of tellurium. The Hall mobilities of unannealed specimens compared favorably with the largest values previously reported for epitaxial layers.

We claim as our invention:

1. The process of preparing an epitaxial lead telluride comprising evaporating in a vacuum a film of lead telluride upon a surface of barium fluoride and then annealing the element so produced by annealing it in a closed container from which all air has been removed.

2. The process recited in claim 1 in which the annealing temperature is 300° to 350°C.

3. The process recited in claim 1 in which the annealing is carried on for a time period of 20 to 100 hours.

4. The process recited in claim 2 in which the annealing is carried on for a time period of 20 to 100 hours.

5. The process of preparing an epitaxial lead tin telluride comprising evaporating in a vacuum a film of lead tin telluride upon a surface of barium fluoride and then annealing the element so produced by annealing it in a closed container from which all air has been removed.

6. The process recited in claim 5 in which the annealing temperature is 300° to 350°C.

7. The process recited in claim 5 in which the annealing is carried on for a time period of 20 to 100 hours.

8. The process recited in claim 6 in which the annealing is carried on for a time period of 20 to 100 hours.

* * * * *